United States Patent

Pelton

[15] 3,691,088

[45] Sept. 12, 1972

[54] PROCESS FOR PREPARING PHOSPHORS

[72] Inventor: Dean E. Pelton, Towanda, Pa.

[73] Assignee: Sylvania Electric Products, Inc.

[22] Filed: Oct. 30, 1970

[21] Appl. No.: 85,797

[52] U.S. Cl.............................................252/301.6 S
[51] Int. Cl...............................................C09r 1/12
[58] Field of Search................................252/301.6 S

[56] References Cited

UNITED STATES PATENTS

| | | | |
|---|---|---|---|
| 2,310,425 | 2/1943 | Goodman | 252/301.6 S |
| 2,732,347 | 1/1956 | Ward | 252/301.6 S |
| 2,623,858 | 12/1952 | Kroger | 252/301.6 S |
| 2,991,383 | 7/1961 | Hardy | 252/301.6 S X |
| 3,010,909 | 11/1961 | Klasens et al. | 252/301.6 S |

FOREIGN PATENTS OR APPLICATIONS

| | | | |
|---|---|---|---|
| 1,106,162 | 3/1968 | Great Britain | 252/301.6 S |

*Primary Examiner*—Tobias E. Levow
*Assistant Examiner*—J. Cooper
*Attorney*—Norman J. O'Malley, Donald R. Castle and William H. McNeill

[57] ABSTRACT

A dry process for preparing cathodoluminescent sulfide phosphors having a small particle size, that comprises forming a relatively uniform mixture of an oxide of a divalent metal, a source of an activator material, and a source of sulfur, in specific ratios and thereafter heating the uniform mixture under controlled conditions in air.

9 Claims, No Drawings

PROCESS FOR PREPARING PHOSPHORS

BACKGROUND OF THE INVENTION

1. Field of the Invention

This invention relates to a process for preparing cathodoluminescent phosphors. More particularly, it relates to a dry process for preparing cathodoluminescent sulfide phosphors having a small particle size.

2. Prior Art

In the preparation of sulfide phosphors heretofore, a mixture of the sulfide host material and the appropriate activator have been heated either in an inert gas atmosphere or in a hydrogen sulfide atmosphere. While these methods have been satisfactory to produce phosphors for many uses, there currently is a need for sulfide phosphors having an average particle size of less than about 3 to about 4 microns and especially an average particle size of from about 0.1 to about 1.5 microns for use in high resolution cathode ray tubes. In U.S. Pat. No. 2,734,872, oxide host material is used in place of a sulfide host material, but gassing in a controlled atmosphere of hydrogen sulfide or hydrogen selenide is necessary. It is believed, therefore, that a process which produces cathodoluminescent sulfide phosphors having an average particle size of from about 0.5 to about 1.5 microns, and is a simple dry process having a one-step firing process is an advancement in the art.

SUMMARY OF THE INVENTION

In accordance with one aspect of this invention there is provided a process for preparing a phosphor composition. The process comprises forming a relatively homogeneous mixture consisting essentially of a divalent metal oxide of a divalent metal, a source of an activator material and a source of sulfur. The divalent metal is selected from the group of zinc, cadmium and mixtures thereof, and the activator material is selected from the group consisting of silver, silver-aluminum, and copper-aluminum. The mixture is heated at a temperature of from about 750° C to about 950° C, in air, for at least about 90 minutes.

DESCRIPTION OF THE PREFERRED EMBODIMENTS

For a better understanding of the present invention, together with other and further objects, advantages, and capabilities thereof, reference is made to the following disclosure and appended claims in connection with the above description of one of the aspects of the invention.

A relatively homogeneous mixture of a source of the appropriate oxide, a source of the activator material, and a source of sulfur is formed. For example, since all of the materials are solids, normal methods of obtaining relatively homogeneous mixture of solids can be used, such as by intimate mixing of solids, such as that provided by ball milling, ribbon blenders, and the like.

The oxides that are used are zinc oxide, cadmium oxide, and mixtures thereof. Relatively pure materials are used, since even minor amounts of contaminants can effect the luminescent properties of the subsequently produced phosphors. In most instances, the purity of the oxides exceed about 99.9 percent by weight. The average particle size of the oxide is less than about 2 microns to insure that the finished phosphor is not greater than about 1.5 microns. Preferably the average particle size of the oxide is from about 0.1 to about 1.5 microns.

When blue-emitting phosphors are desired, zinc oxide or zinc cadmium oxide having a weight ratio of zinc to cadmium of from about 90:10 to about 97:3 can be used. Zinc to cadmium ratios especially preferred are from about 92:8 to about 95:5. When green-emitting phosphors are desired, the ratio of zinc to cadmium will vary depending upon the activator material. When the activator material contains aluminum and copper, essentially the same ratios are used as for the blue-emitting phosphor described above, although it is preferred to have zinc to cadmium ratios of from 95:5 to about 90:10. When the activator material contains silver and aluminum, the ratio of zinc to cadmium can vary from about 55:45 to about 65:35, although ratios of from about 57:43 to about 63:37 are especially desired.

The source of the components of the activator material are in general metal salts of the mineral acids such as nitrates, sulfates, chlorides and the like. The metal salts are generally mixed with from about 16 grams to about 20 grams of zinc sulfide as a carrier to insure good dispersion and accurate weight before mixing the activator material with the source of the host and sulfur. The amount of each source of activator is calculated on the basis of the total weight of the source of host material. On the foregoing basis, from about 0.005 to about 0.030 percent of a metal selected from the group of copper and silver are used and from about 0.005 to about 0.06 percent of aluminum is used.

The source of sulfur is in general pure sulfur powder, that is, having a purity of about 99.9 percent by weight; otherwise, the luminescent properties of the subsequently produced phosphor can be effected. The amount of sulfur can vary from about 35 to about 40 percent by weight of the host material. Especially preferred weights are from about 38 to about 39 percent. When less than about 35 percent sulfur is used, the brightness of the resultant phosphor is significantly lowered. When greater than about 40 percent of sulfur is used, the body color of the resultant phosphor is brown and the brightness of the phosphor is significantly lowered. Any particle size sulfur can be used, since the mixture is heated at temperatures above the vaporization point of sulfur.

After the relatively homogeneous mixture is formed, the material can be heated, in air, at a temperature of from about 750° to 950° C for at least about 90 minutes, although a temperature of from about 850° C to about 875° C is especially preferred. Although longer times of heating can be used, such as 5 to 10 hours or longer, without adverse effect, about 90 minutes is the preferred time when heated within the preferred temperature range.

In order to more fully illustrate the preferred embodiments of the invention, the following detailed examples are given. All parts, proportions and percentages are by weight unless otherwise given.

EXAMPLE 1

About 3,000 parts zinc oxide, about 18 parts zinc sulfide-silver nitrate activator mix, about 30 parts sodium chloride flux and about 1,200 parts sulfur are blended, hammermilled, and reblended. The mixture is heated at a temperature of about 900° C in an atmosphere of air for about 90 minutes. The fired material is washed with about 5 gallons of water containing about 1 liter of acetic acid. The material is then washed to a neutral pH of about 7 with water. The material is then filtered, oven-dried, and sieved. The resultant phosphor has a particle size of about 1.5 microns with a brightness and color equal to a phosphor material made with a sulfide host and fired in a controlled sulfide atmosphere.

EXAMPLE 2

About 190 parts zinc oxide, about 20 parts cadmium oxide, about 84 parts sulfur, about 0.0193 part copper sulfate and about 0.0617 part of a hydrated aluminum sulfate are treated as in Example I. The resultant phosphor has a particle size of about 1.5 microns and is equal in brightness and color to a phosphor material made with a sulfide host and fired in a controlled sulfide atmosphere.

Using essentially the same procedure in Example 2, other phosphor compositions are prepared except that silver in the form of silver nitrate is used in the place of copper sulfate in Example 2. The resultant phosphor has a particle size of about 1.0 micron and is equal in brightness and color to a phosphor material made with a sulfide host and fired in a controlled sulfide atmosphere. Additionally other phosphors having different zinc to cadmium ratio are prepared, for example, a 60:40 (ZnCdO) with about 200 ppm of each of silver and aluminum and 40 parts sulfur. The resultant phosphors have particle sizes of from about 0.1 to about 1.5 microns and are equal in brightness and color to a phosphor material made with a sulfide host and fired in a controlled sulfide atmosphere.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing a cathodoluminescent phosphor composition consisting essentially of a divalent metal sulfide host selected from the group consisting of zinc sulfide, cadmium sulfide and zinc-cadmium sulfide and an activator material selected from the group consisting of silver, silver-aluminum and copper-aluminum, said composition having an average particle size of less than about 1.5 microns, said process comprising:
   a. forming a relatively homogeneous mixture of an oxide of a divalent metal selected from the group consisting of zinc, cadmium and mixtures thereof having an average particle size less than about 2 microns thereof, sulfur, and a source of an activator material containing metal ions selected from the group consisting of silver, silver-aluminum and copper-aluminum and
   b. heating said mixture at a temperature of from about 750°C to about 950°C, in air, for at least about 90 minutes.

2. A process according to claim 1, wherein said average particle size of said oxide is from about 0.1 microns to about 1.5 microns.

3. A process according to claim 1, wherein said oxide is zinc oxide.

4. A process according to claim 1, wherein said oxide is a mixture of zinc oxide and cadmium oxide.

5. A process according to claim 4 wherein said oxide is selected from mixtures consisting of a mixture having a weight ratio of zinc to cadmium from about 55:45 to about 65:35 and a mixture having a weight ratio of zinc to cadmium of from about 90:10 to about 93:3, respectively.

6. A process according to claim 5, wherein said activator material is silver, said silver being present in amounts from about 0.005 percent to about 0.03 percent by weight of said oxide.

7. A process according to claim 5, wherein said activator material is silver-aluminum, said silver being present in amounts of from about 0.005 percent to about 0.03 percent by weight and said aluminum being present in amounts of from about 0.005 percent to about 0.06 percent by weight of said oxide.

8. A process according to claim 5, wherein said activator material is copper-aluminum, said copper being present in amounts of from about 0.005 percent to about 0.03 percent by weight and said aluminum being present in amounts of from about 0.005 percent to about 0.06 percent by weight of said oxide.

9. A process according to claim 1, wherein said sulfur is present in amounts of from about 35 percent to about 40 percent by weight of said oxide.

* * * * *